(12) United States Patent
Rhoads

(10) Patent No.: US 8,890,950 B2
(45) Date of Patent: Nov. 18, 2014

(54) METHODS AND ARRANGEMENTS FOR PROCESSING IMAGE DATA

(71) Applicant: Digimarc Corporation, Beaverton, OR (US)

(72) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 14/022,836

(22) Filed: Sep. 10, 2013

(65) Prior Publication Data

US 2014/0009629 A1    Jan. 9, 2014

Related U.S. Application Data

(60) Division of application No. 13/711,256, filed on Dec. 11, 2012, now Pat. No. 8,532,334, which is a division of application No. 13/208,180, filed on Aug. 11, 2011, now Pat. No. 8,331,724, which is a continuation of application No. PCT/US2011/034829, filed on May 2, 2011, which is a continuation-in-part of application No. 12/774,512, filed on May 5, 2010, now Pat. No. 8,401,224.

(60) Provisional application No. 61/467,862, filed on Mar. 25, 2011.

(51) Int. Cl.
*G06K 9/00* (2006.01)
*G06K 9/40* (2006.01)
*G06T 5/20* (2006.01)
*H04N 1/32* (2006.01)
*G06K 9/20* (2006.01)
*H04N 5/232* (2006.01)
*G06T 1/00* (2006.01)

(52) U.S. Cl.
CPC ........ *H04N 5/232* (2013.01); *G06T 2201/0052* (2013.01); *H04N 2201/3273* (2013.01); *H04N 1/32187* (2013.01); *G06K 9/2063* (2013.01); *G06T 2201/0601* (2013.01); *H04N 2201/3269* (2013.01); *G06T 1/0064* (2013.01); *H04N 1/32133* (2013.01); *H04N 1/32* (2013.01); *H04N 1/32309* (2013.01); *H04N 2201/327* (2013.01)
USPC ........................... 348/100; 382/195; 382/264

(58) Field of Classification Search
None
See application file for complete search history.

(56) References Cited

U.S. PATENT DOCUMENTS

| | | |
|---|---|---|
| 5,613,004 A | 3/1997 | Cooperman et al. |
| 5,646,997 A | 7/1997 | Barton |
| 5,822,360 A | 10/1998 | Lee et al. |
| 5,825,892 A | 10/1998 | Braudaway et al. |
| 5,859,920 A | 1/1999 | Daly et al. |
| 5,862,260 A | 1/1999 | Rhoads |
| 5,889,868 A | 3/1999 | Moskowitz et al. |
| 5,933,798 A | 8/1999 | Linnartz |

(Continued)

*Primary Examiner* — Jon Chang
(74) *Attorney, Agent, or Firm* — Digimarc Corporation

(57) ABSTRACT

The present disclosure provides methods and systems for processing data. One claim recites a method practiced using used a user's camera-equipped portable computer system. The method includes the acts of: capturing image data corresponding to a region using the camera of the portable computer system; applying a filter to the captured image data, in which the filter prioritizes image data at a center of the region and averages images data at a relative distance from the center region; and searching the filtered image data for hidden keys. Of course, other combinations and claims are provided as well.

5 Claims, 11 Drawing Sheets

(56) References Cited

U.S. PATENT DOCUMENTS

| | | |
|---|---|---|
| 6,320,829 B1 | 11/2001 | Matsumoto et al. |
| 6,442,284 B1 | 8/2002 | Gustafson et al. |
| 6,614,914 B1 | 9/2003 | Rhoads et al. |
| 6,654,887 B2 | 11/2003 | Rhoads |
| 6,714,683 B1 | 3/2004 | Tian |
| 6,724,914 B2 | 4/2004 | Brundage et al. |
| 6,751,337 B2 | 6/2004 | Tewfik et al. |
| 6,988,202 B1 | 1/2006 | Alattar |
| 6,993,154 B2 | 1/2006 | Brunk |
| 7,013,021 B2 | 3/2006 | Gustafson |
| 7,076,082 B2 | 7/2006 | Sharma |
| 7,412,072 B2 | 8/2008 | Sharma et al. |
| 7,489,801 B2 | 2/2009 | Sharma et al. |
| 7,519,819 B2 | 4/2009 | Bradley et al. |
| 7,706,570 B2 | 4/2010 | Sharma et al. |
| 7,978,875 B2 | 7/2011 | Sharma et al. |
| 8,140,848 B2 | 3/2012 | Brundage et al. |
| 8,600,053 B2 | 12/2013 | Brundage et al. |
| 2002/0090109 A1* | 7/2002 | Wendt .......................... 382/100 |
| 2003/0026453 A1 | 2/2003 | Sharma et al. |
| 2006/0062428 A1 | 3/2006 | Alattar et al. |
| 2006/0198549 A1* | 9/2006 | Van Vugt et al. .............. 382/103 |
| 2008/0300011 A1 | 12/2008 | Rhoads |
| 2009/0116683 A1 | 5/2009 | Rhoads |
| 2011/0098029 A1 | 4/2011 | Rhoads et al. |
| 2011/0098056 A1 | 4/2011 | Rhoads et al. |
| 2012/0179914 A1 | 7/2012 | Brundage et al. |

* cited by examiner

METHODS AND ARRANGEMENTS FOR PROCESSING IMAGE DATA

RELATED APPLICATION DATA

This application is a division of application Ser. No. 13/711,256, filed Dec. 11, 2012 (now U.S. Pat. No. 8,532, 334), which is a division of application Ser. No. 13/208,180, filed Aug. 11, 2011 (now U.S. Pat. No. 8,331,724), which is a continuation of international application PCT/US11/34829, filed May 2, 2011, which is a continuation-in-part of application Ser. No. 12/774,512, filed May 5, 2010 (now U.S. Pat. No. 8,401,224), and which also claims priority to provisional application 61/467,862, filed Mar. 25, 2011.

TECHNICAL FIELD

The present technology primarily concerns smartphone interactions with images—such as are found on printed objects.

BACKGROUND AND SUMMARY

The present technology includes improvements to, and in different embodiments makes use of, assignee's earlier work detailed in U.S. Pat. Nos. 6,122,403, 6,408,082 and 6,590, 996, and published applications 20060115110, 20070189533, 20080112596, 20080300011, 20090116683, 20100046842, 20100048242, 20100150434, 20100317399, 20100261465, 20110098029, 20100165158, 20110098056 and 20100228632. The reader is presumed to be familiar with such prior work, and able to incorporate such teachings into implementations utilizing the presently-detailed technology.

Smartphones are increasingly being used with "visual search" applications. One visual search application decodes digital watermark data steganographically encoded (i.e., hidden) in printed imagery (such as in a magazine or on product packaging) and enables the phone to link to associated information and services, or take other action. Exemplary digital watermark technology, and visual search applications, are detailed in the above-cited patent documents.

Perspective distortion can sometimes interfere with proper decoding of digital watermark data. That is, if a watermarked object is imaged by a smartphone at a relatively large off-axis angle (e.g., greater than 15 or 30 degrees), the hidden watermark data may be sufficiently distorted by the perspective viewing angle that the decoding algorithm does not recognize it.

A related concern is consumer confusion. If a consumer uses a smartphone to image a magazine page, and no watermark is promptly detected, is it because the page does not include a watermark to which the smartphone should respond? Or is it because the magazine page is presented with an unsuitable perspective?

Accordingly, it is desirable to alert consumers of the presence of watermark data without requiring precise smartphone positioning.

It is also desirable to assist consumers in capturing imagery that has relatively little perspective distortion (e.g., less than 15 or 30 degrees).

In accordance with one aspect of the present technology, the presence of hidden data is reliably detected notwithstanding perspective angles exceeding 30, 45, or 60 degrees, or more.

In accordance with another aspect of the present technology, a smartphone provides feedback (e.g., on a display screen) that aids a user in positioning the smartphone so that the captured imagery has relatively little perspective distortion.

The foregoing and many other features and advantages of the present technology will be more readily apparent from the following detailed description, which proceeds by reference to the accompanying drawings.

DETAILED DESCRIPTION

Figure 1:
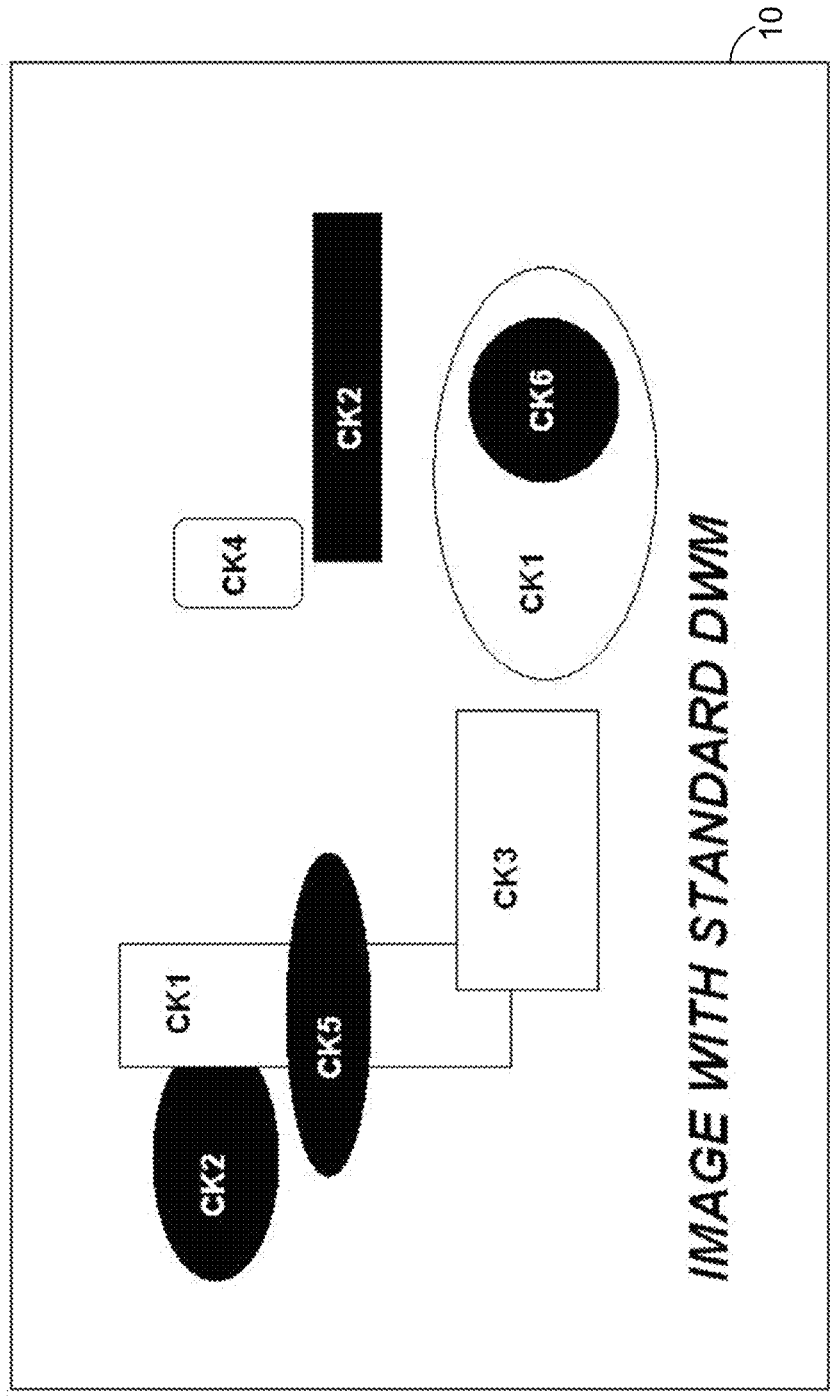
FIG. 1 shows an image including plural hotspot regions encoded with various keys. These may be regarded as YB-Dome spatial chromakeys. Depicted are spatially overlapping "analog" chroma-encoded regions. These are essentially "invisible" to the human eye, but seen by a digital watermark detector.

As shown in FIG. 1, an image 10 is encoded in accordance with one aspect of the technology to define one or more regions (CK1, CK2, etc.) that can be sensed by a suitably-equipped mobile device (e.g., a smartphone/cell phone), but are imperceptible to humans. When such a mobile device senses one of these regions, it takes an action in response.

The content of image 10 can be arbitrary. Details (except the hidden regions) are not shown for clarity of illustration.

The regions can be of any shape; only a few are illustrated. As indicated, they may overlap in layered fashion. Each region has a key associated with it (e.g., CK1, CK2, etc.). Because the preferred embodiment employs a chrominance-based embedding arrangement, these keys may be termed chroma keys. However, other embedding arrangements can alternatively be used.

("YB" in the drawing title refers to Yellow-Blue. "Dome" refers to an arc-shaped area in Fourier-space in which the keys are manifested, as detailed further below.)

Figure 1A:
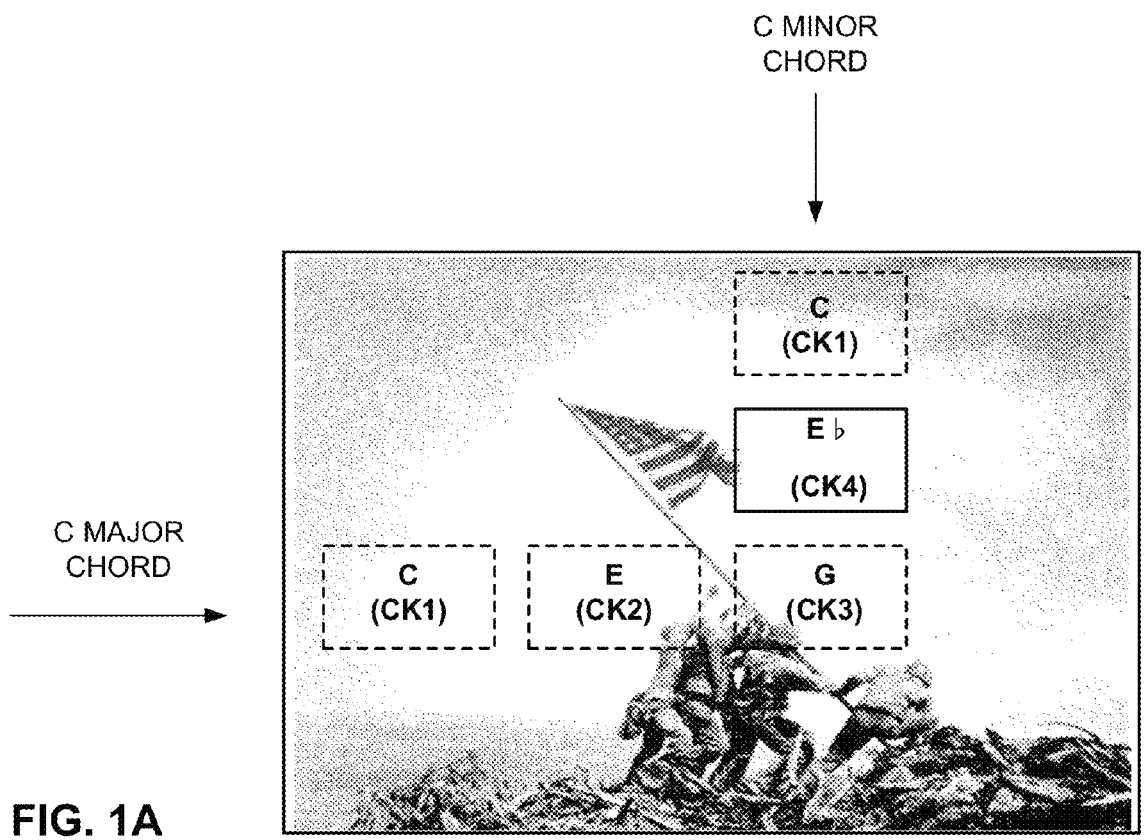
FIG. 1A shows another image similar to FIG. 1, with which a smartphone can interact to yield different musical sounds.

FIG. 1A shows an exemplary illustration, employing five regions, hidden in the iconic Iwo Jima photograph but shown as visible for explanatory purposes. When the left-most region is sensed by a smartphone, it renders a musical note at the pitch "C." The adjacent region causes the phone to render a pitch at "E." Similarly with the next one, at "G."

The top-most region similarly causes the phone to render a musical note at the pitch "C." Beneath it, however, is a region that causes the phone to render the musical note $E^\flat$. Below is the "G" region noted above.

If a user sweeps a suitably-programmed smartphone horizontally across the image from left left to right, so that the phone's camera "sees" the horizontal row of regions in sequence, a C-major chord progression is sounded. Conversely, if the user sweeps the phone vertically, downwardly, across the indicated regions in the image, a C-minor chord progression is sounded.

More particularly, in this example the regions are encoded with four different keys. The same key (CK1) is used for both the left-most and top-most regions, since they both correspond to the same musical tone. Different keys CK2, CK3 and CK4, are used for the other three regions.

In the illustrated example, the image also is digitally watermarked (DWM) in known fashion to steganographically convey a plural-bit payload of auxiliary data (e.g., 32- or 128-bits)—although this is not always required. These plural bits can identify a data structure that is consulted by the smartphone in determining what response should be associated with which key.

Identification of the data structure by the plural bit auxiliary data can be by various means. One is a pointer (e.g., an address) to a local or remote table, or database record. In this instance, the data structure indicates that if CK1 is detected, the phone should render a musical tone of "C" (i.e., 262 Hz). A complete table may instruct the phone to respond to different keys as follows:

TABLE I

| | |
|---|---|
| CK1 | Render 262 Hz tone |
| CK2 | Render 330 Hz tone |
| CK3 | Render 392 Hz tone |
| CK4 | Render 311 Hz tone |

This table is exemplary only, and the illustrative responses are more basic than may often occur—simply for expository convenience.

A tone may sound for a fixed duration, e.g., 1 second, commencing with initial detection of the corresponding key region, or it may persist for as long as the region is within the field of view of the smartphone camera. In the latter case, chords of plural notes can be rendered by positioning the camera so that it can view some—or all—of the depicted regions. The chord is augmented with more notes as the camera is moved away from the image, and resolves to fewer notes as the camera is moved closer.

The use of auxiliary data to indicate what responses should be associated with different keys allows simple dynamic reprogramming of the user experience, even with a "fixed" image. For example, by simply changing data in the table to which the illustrative auxiliary data (watermark) points, the image can trigger a wholly different set of responses—all without modification of the imagery.

Figure 2:
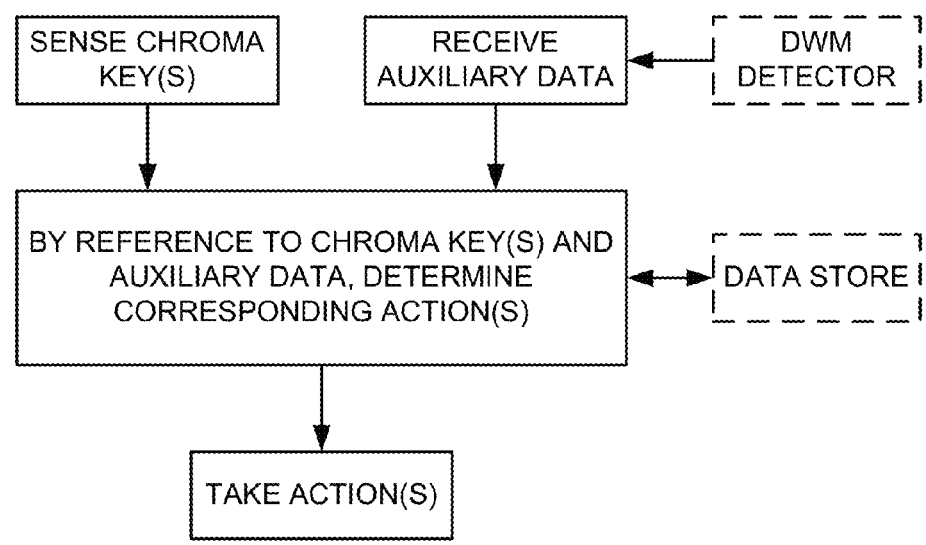
FIG. 2 is a flow chart of a method that can be used in conjunction with the image of FIG. 1A.

A flow chart detailing the just-described method is shown in FIG. 2.

Figure 3:
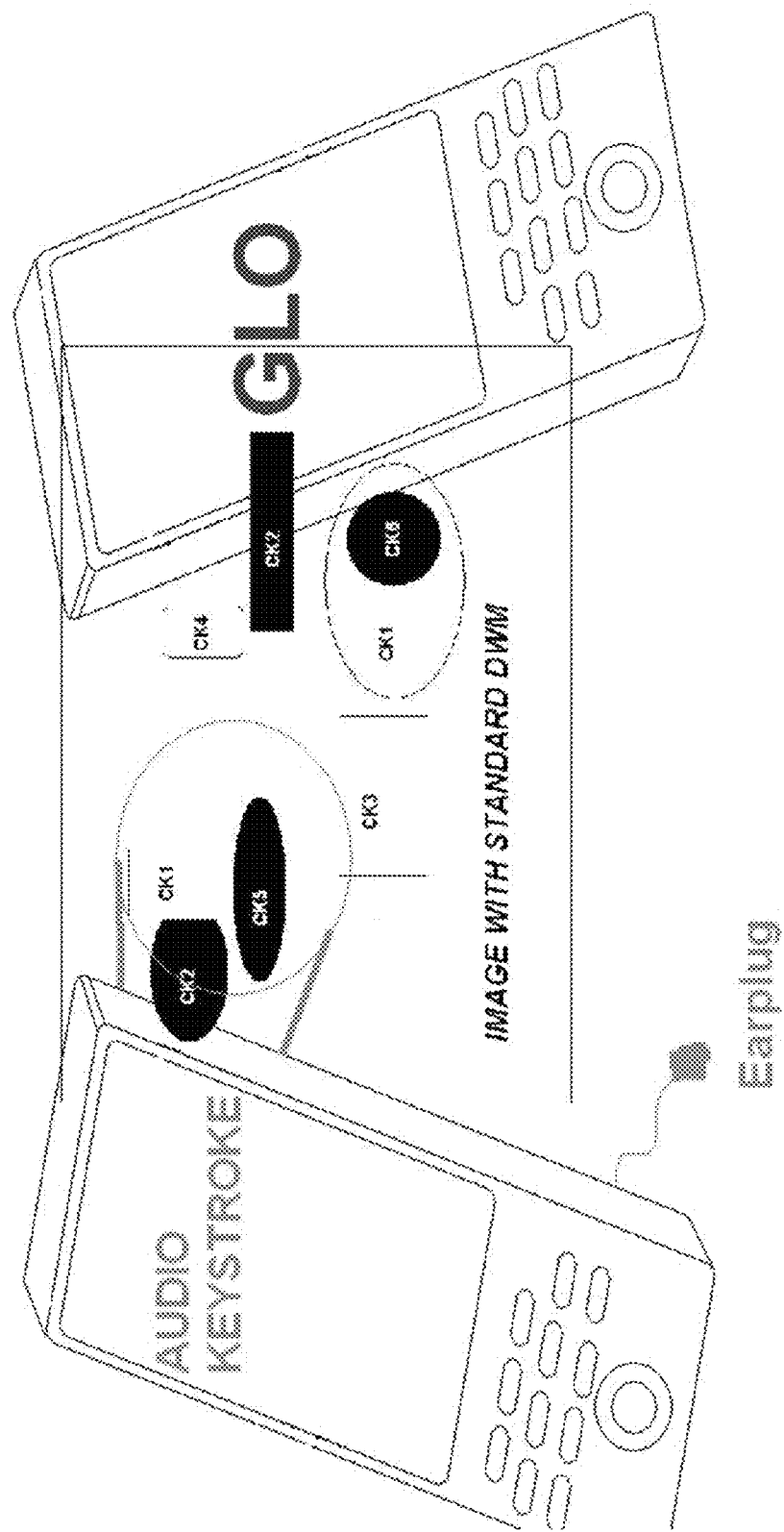
FIG. 3 is an illustration showing some of the different behaviors that can be triggered in a smart phone by detection of one or more hotspot regions in the image of FIG. 1. Depicted are both an audio-mode, and a HotMap (GLO) mode.
Figure 4:
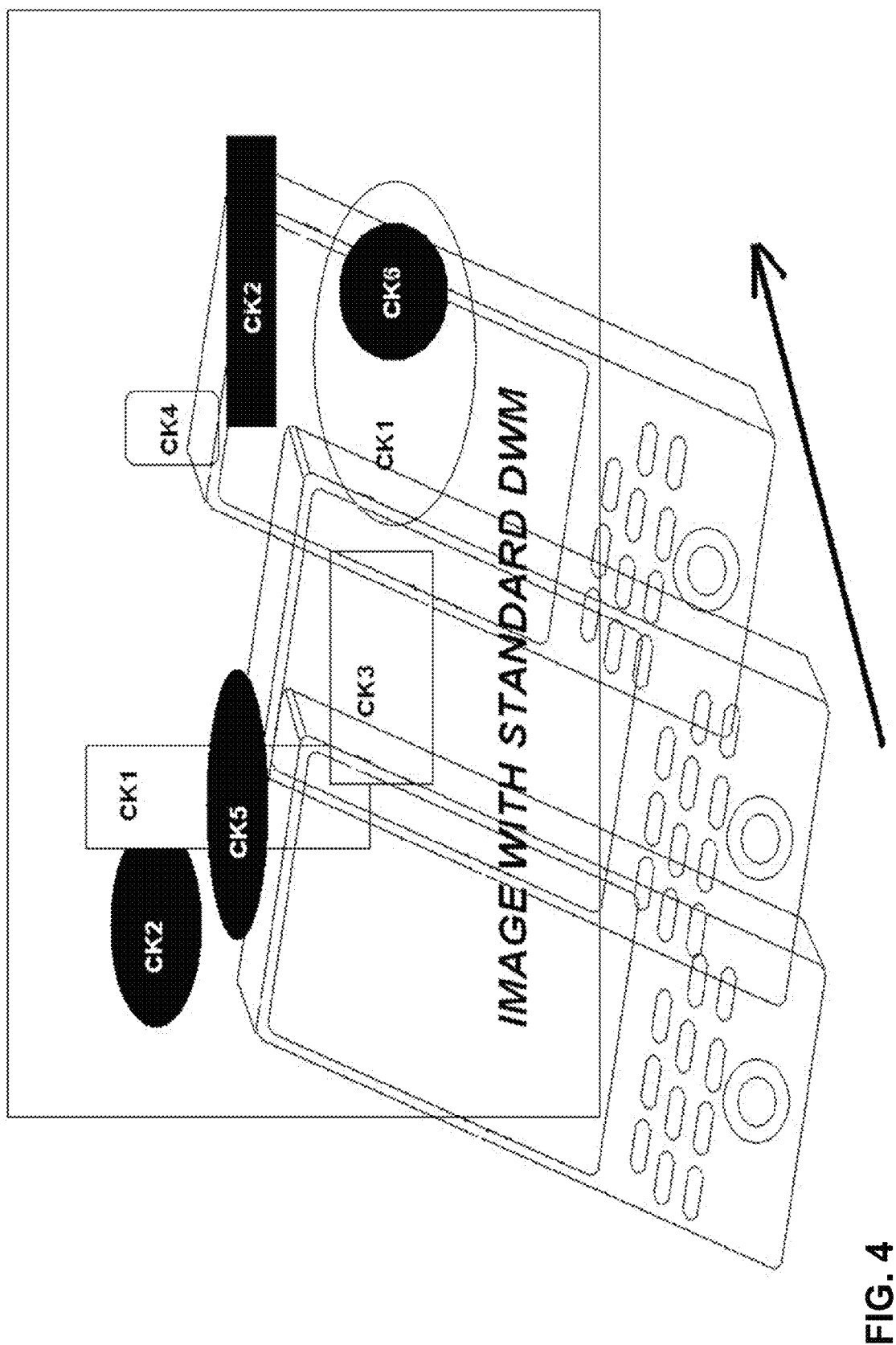
FIG. 4 shows that user interaction with imagery encoded in accordance with the present technology can employ motion.

FIGS. 3 and 4 further illustrate the just-discussed feature, by which a smartphone camera detects different hidden regions in an image, and can yield different outputs as the phone is moved.

"GLO" in FIG. 3 is an acronym for Graphic Latent Overlay. This technology is detailed in documents including published patent specifications 20080300011 and 20090116683, and refers to arrangements in which detection of a first feature (commonly a steganographically encoded feature) in mobile phone-captured imagery triggers display of a second graphical feature on the phone screen—overlaid on the image in which the first feature was detected. In some instances, the overlaid feature is presented on the screen at a position that is dependent on the position of the first feature in the phone's field of view. The overlaid feature may also be warped to correspond with apparent warping of the first feature.

Related technologies are detailed in patent publications 20110098029 and 20110098056, where such overlaid features are termed "baubles" (and may be based on visible and/or steganographic features of captured imagery).

Thus, instead of playing a musical tone when a key region is sensed, the phone can respond by overlaying a graphical display on the captured imagery.

Of course, playing musical tones and overlaying graphical displays are a few of countless behaviors that detection of a key region can trigger. Any imaginable action or script can be similarly triggered when one or more of the hidden regions (which may be regarded as "hotspots") is sensed.

Consider, as a particular example, a photo of members of a hockey team. The oval region of each player's face is marked with a different hidden key, CK1-CK20. When a user directs the smartphone camera to a particular player's face, the corresponding key is detected. A watermark is also detected from the image (and may span the entire image). The watermark payload points to a table, like Table I above, having an entry for each of keys CK1-CK20. This table, in turn, may store links to Flash video presentations, resident at an NHL web server or in the cloud, that show season highlights for that respective player. When the user moves the smartphone camera to view different faces in the team picture, different video plays from the past season are rendered on the user's phone.

(The watermark payload can serve other purposes as well. For example, the payload can include one or more flag bits instructing the smartphone not to provide a response if plural keys are detected within the captured imagery. Alternatively, they may instruct the smartphone to prompt the user to more closely direct the camera to one particular feature (face) in the image. All prior art uses of watermark signaling can also be employed in conjunction with the present arrangements.)

While images are commonly perceived in the spatial (or pixel) domain, a number of other representations are also useful, as is familiar to those skilled in the art. Generally, these other representations are termed "transform domains." One popular transform domain is Fourier space (commonly called the spatial frequency domain, when used with images). By applying, e.g., a discrete Fourier transform (DFT), or a discrete cosine transform (DCT) to an image (either as a whole, or more commonly as divided into square regions, e.g., 8×8 pixels or 32×32 pixels), the image is decomposed into a set of coefficients—each indicating an amplitude of a corresponding spatial-frequency component. The resulting set of information can be depicted on a complex half-plane coordinate system, as shown in FIG. 5.

Figure 5:
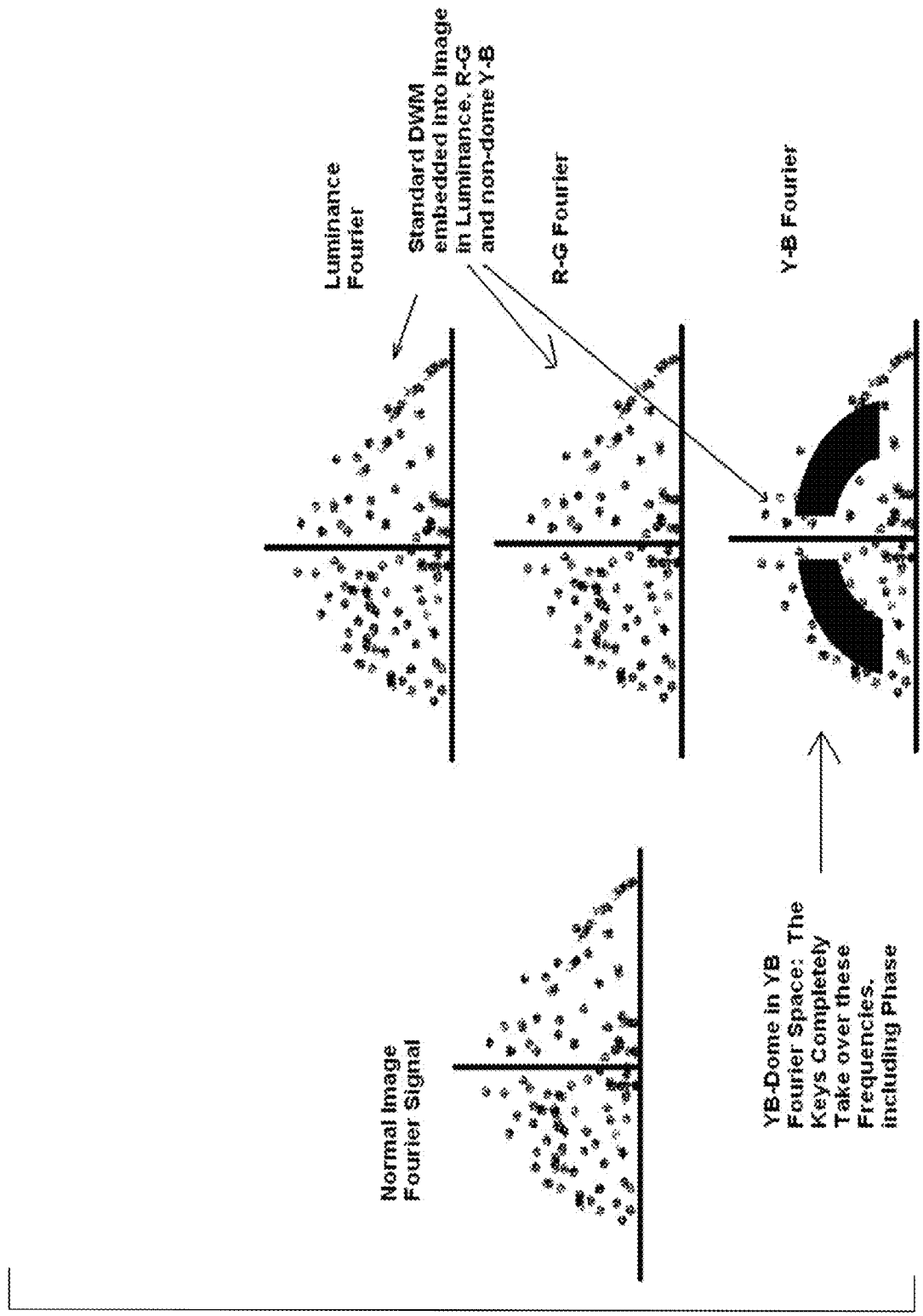
FIG. 5 illustrates decomposition of an image into luminance and dual chrominance channels in the spatial frequency domain, and embedding of a key in the Y-B channel. Particularly detailed is allocation of the YB-Dome signal space, including how such signal can take over certain frequency bands—with no need to share with existing artwork.

The left part of FIG. 5 shows a representative spatial frequency domain representation of a sample image (e.g., the Iwo Jima image earlier presented). This image is encoded with a prior art digital watermark that conveys auxiliary data. (A suitable watermark is detailed in U.S. Pat. No. 6,590,996.) The watermark signal energy is interspersed among the rest of the image energy, and is not separately identifiable in FIG. 5.

The image may be divided into component image planes, such as luminance, and dual chrominance channels: R-G (red-green) and Y-B (yellow-blue)—each of which has its own Fourier space representation. These three channels, in Fourier-space, are shown at the right side of FIG. 5.

In the illustrated embodiment, the encoding of the keys into regions of the image is achieved by adding energy in one of the chrominance channels (e.g., Y-B). This can be done without objectionable visible effect because the human visual system (HVS) is less sensitive to color than it is to luminance.

Figure 6:
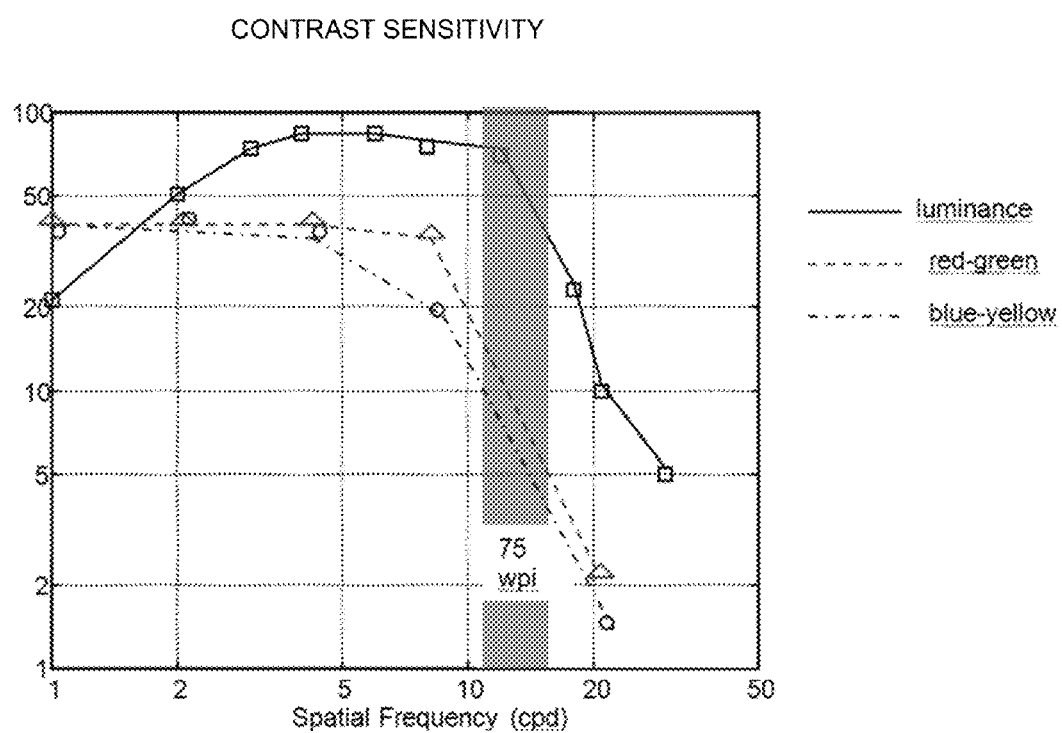
FIG. 6 is a chart showing the sensitivity of the human visual system to the three channels of FIG. 5, as a function of image spatial frequency.

This is shown in FIG. 6, which plots HVS sensitivity for luminance, red-green chrominance, and yellow-blue chrominance, as a function of spatial frequency, in cycles per degree. (This chart is based on data collected at a viewing distance of 12 inches.) As can be seen, HVS sensitivity drops off sharply at chrominance spatial frequencies above 10 cycles per degree (cpd), and is down dramatically at 20 cycles per degree. Sensitivity above 25 or 30 cycles per degree is essentially nil.

In contrast, image sensors used in cameras can commonly distinguish chrominance features at such spatial frequencies.

Thus, to encode a key in an image region, such as CK1 in FIG. 1 or 1A, energy can be added to the yellow-blue chrominance channel, desirably at frequencies of above 10, 20, 25 or 30 cpd—where the effect is generally not noticeable to human observers, but can readily detected from optical sensor data.

In the preferred embodiment the added energy needn't be exclusively above the indicated frequency. But desirably most of the added energy is in that range (e.g., more than 50%, 75%, 95%, or 98%).

In this embodiment, and in others, the magnitude of the added energy can also be scaled to achieve a desired level of visibility (or invisibility). In other embodiments, signal energy at frequencies primarily below 10 cpd can be employed, if the magnitude of the added energy is low enough to be visually un-objectionable.

One example of suitable encoding, in Fourier space, is shown in the lower right of FIG. 5 by the black bands. This added signal energy dominates existing image energy in these spectral frequencies (including phase), but the effect typically is essentially imperceptible to human viewers. The effect is to slice out a region in chrominance space and allocate it to representing a hidden a key. Thus encoded, a suitably-equipped smartphone detector can quickly discover the presence of the hidden region in the image, and determine its extent, and respond to such discovery.

In many instances it is desirable to be able to distinguish different keys, such as CK1, CK2, etc., in FIG. 1. This can be done by representing different keys with different Fourier domain zones of signal energy in the chosen (e.g., Y-B) chrominance channel (including phase). Such arrangement is shown in the upper right of FIG. 7.

In particular, this spatial frequency domain plot shows 10 keys, 150a through 150j. In FIG. 1, region CK1 can be encoded by adding signal energy corresponding to the keystone-shaped Fourier zone 150a to that image region. Likewise, image regions CK2-CK5 can be encoded by adding energy at spatial frequencies indicated by keystone zones 150b-150e. Five additional keys can be represented by adding energy corresponding to the spatial frequency zones labeled 150f-150j. (It will be recognized that the discussed plot encompasses ten different keys. A particular region of the imagery would not necessarily have this depicted signal composition in Fourier space. More likely, only one or a few of the keystone features would be present.)

Again, the illustrations do not show phase, which is a helpful dimension of these hidden signals. The phase component contributes certainty to detection of these keys (i.e., increasing signal-to-noise ratio).

In one particular embodiment, different keys may be of opposite phase polarity (analogous to +1/−1). One key, CK-a, may be represented by the keystone zone 150a with a certain phase profile across the zone, and another key, CK-b, may be represented by energy in the same keystone zone 150a, but with a phase profile that is 180 degrees out of phase relative to key CK-a. This results in a doubling of the keyspace (e.g., the ten zones 150a-150j can represent 20 distinguishable keys).

Figure 7:
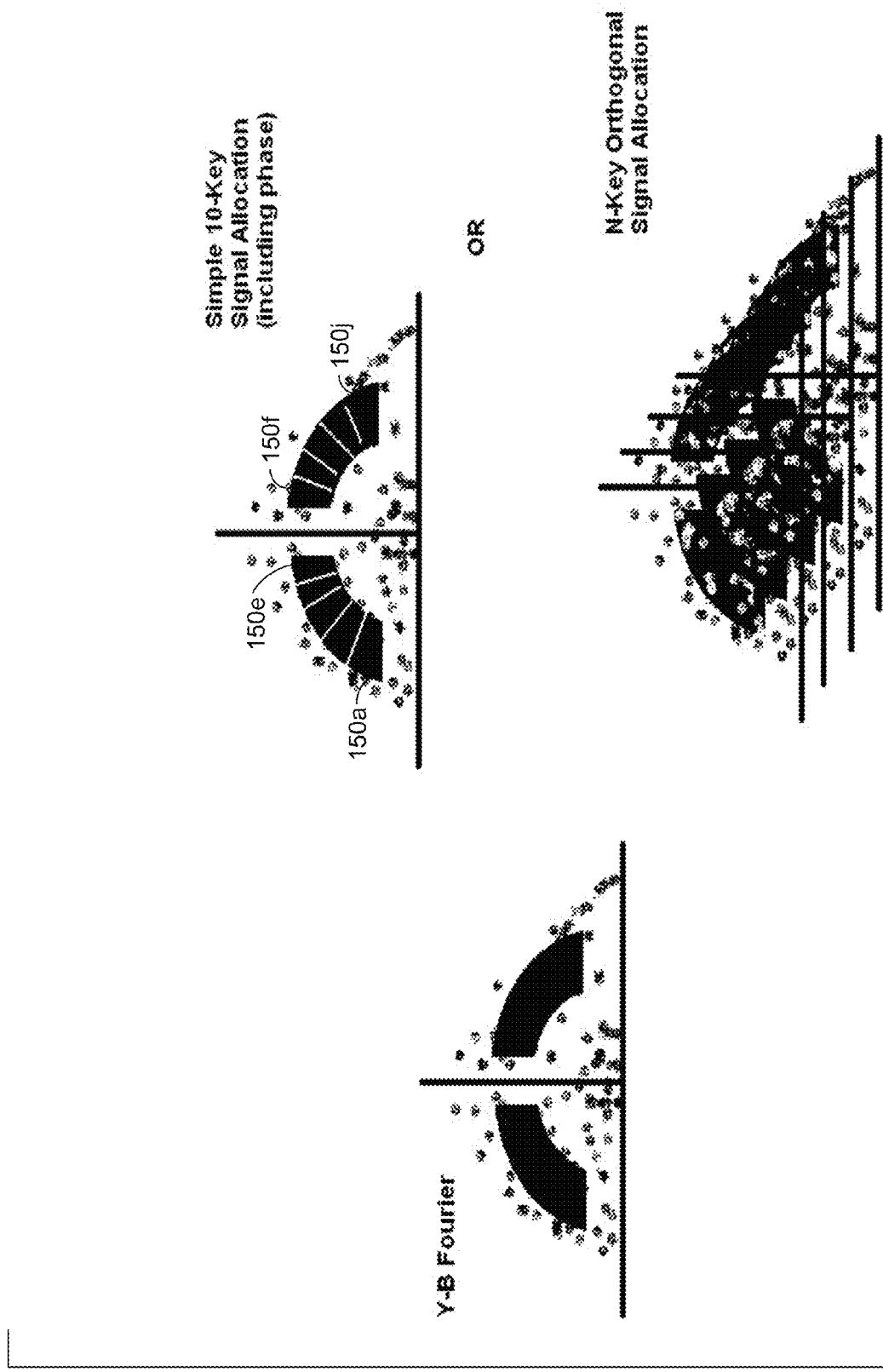
FIG. 7 illustrates that plural different keys can be encoded within a single chrominance channel.

A further multiple-key arrangement is shown in the lower right of FIG. 7. Here N mutually-orthogonal signals in Fourier space are employed. For purposes of illustration, a simple example is for one signal to be a sine wave at an image frequency f. Another may comprise a cosine signal at the same frequency. A third may comprise a sine signal at a frequency 2f. Etc. (The design of orthogonal signals in Fourier space is within the capability of the artisan, although such signals are difficult to represent in simple drawings. In one view, two keys are orthogonal if the product of their phase profiles yields zero.)

Typically, all keys in an image are encoded at the same magnitude, usually at a level that renders the keys imperceptible to humans in the rendered imagery. Having a uniform magnitude across all keys can be useful in detection, since detection of one key provides magnitude information that can be used to help discriminate the presence of other keys.

In some embodiments, certain keys may have different magnitudes (e.g., they may be partially "on"). This can be used to further expand the encoding space. E.g., key CK-c can have a magnitude that is half that of key CK-d, but the keys are otherwise the same in spectral frequency content and phase profile. Instead of binary values of single keys (e.g., +phase and −phase), quaternary and other multi-valued symbols can be used.

If the relations between different magnitudes are known by the detector (e.g., some keys are 100% "on"; other keys are 50% "on," and still others are 25% "on,"), this knowledge can again be used as a basis in discriminating keys. (These may be regarded as "analog keys.")

In a system employing multiple keys, each can trigger a different action (e.g., different tones in the FIG. 1A example). Still further actions can be triggered when multiple keys are overlaid in an image region (e.g., where CK5 overlaps CK1 in FIG. 1). Thus, in a 10 key system, there may be ten responses corresponding to the ten individual keys. Nine further responses can correspond to regions where key 1 is overlaid with one of keys 2-10. Eight further responses can correspond to where key 2 is overlaid with keys 3-10. Seven further responses can correspond to where key 3 coexists with keys 4-10. Etc. Thus, in a system that contemplates only layers of up to two keys, 55 different states can be defined. (A geometric increase of possible states naturally occurs if three- or more keys are overlaid.)

If the keys have different magnitudes, the responses triggered by the keys can vary accordingly. In the tonal example of FIG. 1A, for example, if key CK3 is half the magnitude of the other keys, then its corresponding tone may be rendered at half the volume of those triggered by the other keys.

The smartphone detector can apply Fourier-domain templates for the different keys it expects to encounter—looking for the existence of the hidden signals. This can comprise a correlation detector that performs multiplications with each of the respective key templates—judging whether resultant output signals exceed a threshold value.

The template(s) can encompass more of Fourier space than the precise boundaries of the sought-for key(s), allowing detection of keys in the case of distortion of the imagery (with consequent distortion of the keys in Fourier space).

Figure 8:
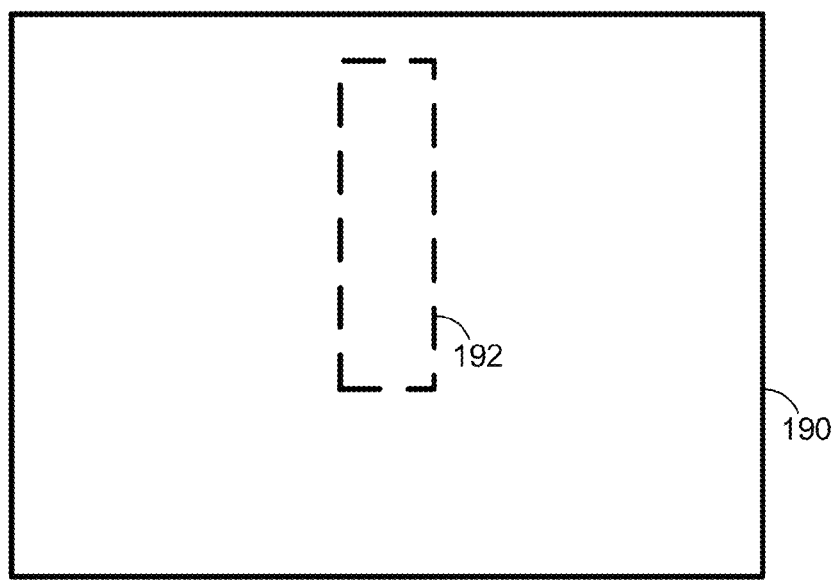
FIG. 8 shows that a sub-region of smartphone's field of view can be used to detect keys in imagery.

Typically, smartphone cameras have a rectangular field of view (e.g., 2048×1536 pixels). In some instances it is desirable for the smartphone camera to be responsive to keys only in a sub-region of this field of view. Such an arrangement is shown in FIG. 8, in which the full camera field of view is the image frame 190, yet responses are only triggered by keys found within the sub-region 192. The shape of the sub-region can be arbitrary; the illustrated rectangle (of about 250 pixels in width by about 900 in height) is only exemplary.

In another arrangement, the zone 192 is circular or oval. Moreover, the software that controls use of sampled image data from region 192 can apply a foveal filter: using all the pixels at the center of the region for most acute detection, but using a sparser sampling of pixels near a periphery of the region 192, so that sensitivity or acuity tapers off. (Instead of discarding more remote pixels from consideration, groups of outlying pixels may be averaged to yield a foveal effect: dense pixel information in the center of the zone, and lower resolution pixel information at greater distances.)

(Such foveal filtering can be a preamble to many different types of image processing, including feature and object recognition, machine vision, watermark decoding, fingerprint calculation, image-based context determination, and the other types of processing detailed in the earlier-cited patent publications.)

A camera-equipped detector using the present technology can discern the spatial extent of key regions, e.g., identifying region boundaries to an accuracy of tens of imaged pixels or less (e.g., 5 to 10 "waxels"—watermark signal elements). The detector can thus "image" the hidden keys, e.g., generating a virtual map of their locations within the imagery.

If the geometrical shapes of the keys are known in advance (e.g., if keys are circular, or square, or equilateral triangles), then their shapes in the captured imagery can be used to characterize any off-axis viewing of the image. This information, in turn, can be used to aid detection of any watermark signal encoded in the imagery.

For example, the device processor can re-sample the image data in correspondence with distortion of the known key shapes. If the key is known to include two parallel edges of the same length, yet a first edge appears in the captured imagery to be 50% shorter than a second edge, then image points along the first edge can be resampled by the processor at a spatial frequency twice those alone the second edge—with interpolated sampling rates being used along intermediate parallel lines. The watermark decoding process can then be applied to the resampled image—from which this aspect of a perspective warp has been effectively removed.

A more sophisticated approach to dealing with perspective does not require knowledge of geometrical key shapes. Rather, it relies on knowledge of a key's Fourier domain representation.

Figure 9A:
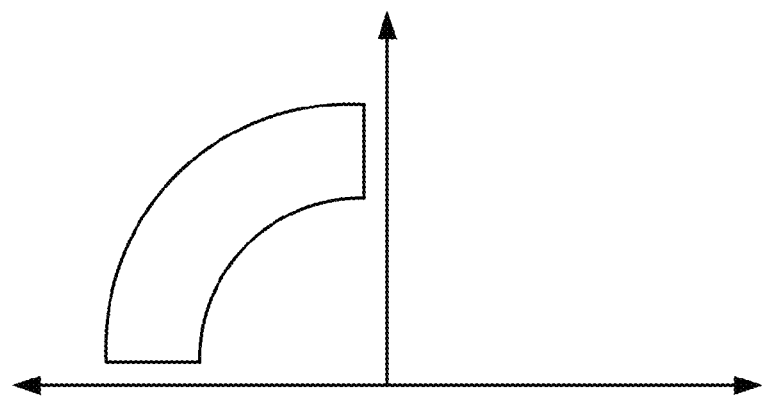
FIGS. 9A and 9B show how a key may be warped by perspective or other distortion of the image, allowing such distortion to be determined.
Figure 9B:
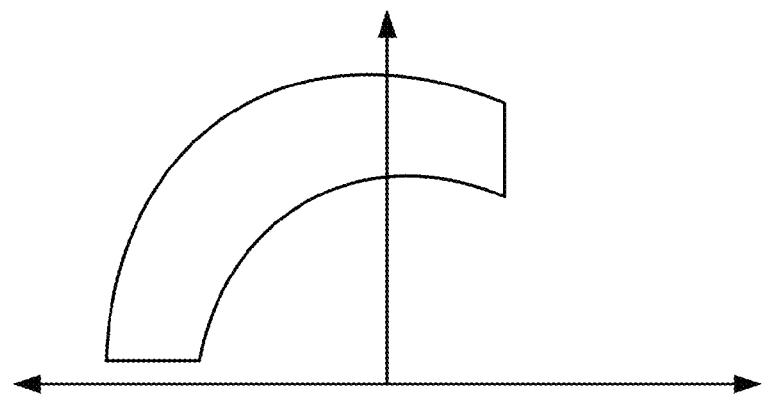

To illustrate, an original image may include a key having a Fourier domain shape shown in FIG. 9A. If the image is captured from an off-axis perspective, the key shape may bulge, e.g., resulting in the Fourier domain representation shown in FIG. 9B. The transformation, from FIG. 9A to 9B, reveals the apparent transformation of the image as viewed by the camera (e.g., affine and perspective warping).

A programmed processor (e.g., in a smartphone) can perform a brute-force search for an arc-like feature in Fourier space, and then sleuth corresponding warp parameters of the image from the shape of the discovered arc. Another approach employs Fourier-Mellin-based processing to locate the distorted arc zone within Fourier domain image data, using technology akin to that that detailed in U.S. Pat. Nos. 6,408,082 and 6,590,996.

The detailed keys are typically conspicuous in Fourier space, allowing ready determination of warp parameters by such methods—at least in a gross sense. Once a rough sense of the image viewing perspective is thereby discerned (e.g., to within 5 or 10 degrees), the image data can be resampled accordingly, e.g., as if captured from an on-axis camera perspective. Then calibration signals commonly found in digital watermark signals (e.g., per the just-cited patents) can be used to resolve remaining small distortions in the resampled imagery, allowing accurate reading of large payload watermark data.

Figure 12:
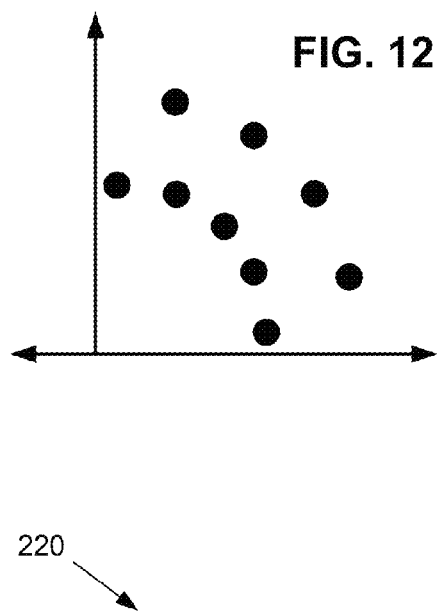
FIG. 12 shows another key representation in Fourier space.

The artisan will recognize that calibration signals in the cited watermark technology serve as a search-space accelerator. The key technology detailed herein can be viewed as a supplemental calibration signal, and detectors may be tuned to search off-axis camera angles. Keys for this purpose can take the form of paired staggered strings of pearl-like-features in the Fourier Y-B magnitude space (i.e., two concentric rings of peaks in the Fourier domain, such as shown in FIG. 12). The detector can then apply a family of templates—corresponding to these key features (or other known key features) as they would appear in the Fourier domain if the image is viewed in stepped angles off-axis (e.g., in 5 degree steps, from 0 to 45 degrees) and employing Fourier-Mellin analysis.

This operation is suitable for quick performance by a cloud-based processor, e.g., in 250 ms or less. The smartphone can send a 32×32 pixel region from the center of the camera view to the cloud processor (either in the pixel domain, or after transforming to Fourier space—possibly with compression that does not corrupt the watermark signal). The cloud processor, in turn, applies the cited templates to the received data to locate the key signal, and returns an estimate of the viewing angle to the phone. The phone then resamples the image in accordance with this estimated viewing angle, and applies the cited watermark decoding process to extract the watermark payload.

(Other divisions of labor between the phone and cloud are likewise possible, e.g., with the cloud doing all of the processing including extracting the watermark payload.)

In some embodiments, the keys can be designed to have "fragile" properties, so as to aid in image/document authentication. For example, the hidden keys can be composed of spectral frequencies that are at or near the high frequency limit for imaging sensors to detect. The magnitudes of these signals can also be tailored so that the keys are barely detectable in the original image. If such an original image is scanned and re-printed, this low amplitude and/or high frequency data will likely degrade so that it is no longer detectable. CCD, CMOS and other image sensors can be designed with such technology in mind, to achieve desired properties in the combined system.

One application of this technology is as a keypad, e.g., akin to the sorts conventionally used to open a safe, set alarms, etc. For example, a smartphone can capture a frame of imagery from print media or another screen and, by reference to a watermark decoded from the imagery or other auxiliary data, overlay a graphic showing a touchpad. The user can touch the different buttons displayed on the screen. The touch-sensitive screen provides output coordinate data by which pixel regions in the captured imagery corresponding to these touches can be determined. Hidden keys detected at these regions in the captured imagery are noted, and the sequence of such keys defines the "combination" or other code entered by the user (e.g., CK4, CK2, CK5, CK9). If the entered code matches a stored sequence, an action can be taken. Or other action can be taken in accordance with the keystrokes (e.g., reprogramming a thermostat, such as detailed in published application 20100261465).

In a variant embodiment, the outlines of the hidden keys are discerned from the captured image, and made visible as graphic overlays. Again, these can be touched in a desired sequence. By reference to the keys, in conjunction with the watermark, responsive action can be taken.

In a further variant, the graphic overlay can change as further keys are touched.

Although the detailed arrangement employs digital watermarking to convey auxiliary information by which actions corresponding to sensed key regions can be determined, this is not necessary. Other communications means can be utilized, e.g., RFID chips, barcodes, header data, etc. Alternatively, a fingerprint of the imagery can be calculated, and matched with reference information in a database to identify the image, which identification can also serve to identify metadata by which associations between the keys and appropriate responses can be determined. (Examples of image/video fingerprinting are detailed in publications 7,020,304 (Digimarc), 7,486,827 (Seiko-Epson), 20070253594 (Vobile), 20080317278 (Thomson), and 20020044659 (NEC).)

In still other arrangements, the auxiliary data is not necessary. Instead, the different keys can be ascribed meaning by a known reference, such as a data table stored in the smartphone or elsewhere—not pointed-to or otherwise indicated by auxiliary data. When a key is detected, the reference is consulted to determine what behavior should be performed.

While the detailed arrangements typically employ a Fourier transform (e.g., an FFT), any number of other image transforms may alternatively be employed. Examples include DCT, wavelet, Haar, Hough, etc.

It should be recognized that tonal signatures, such as the chord progression illustrated in FIG. 1A, can be used as a quick check of the authenticity, or other attribute, of an image.

Although reference was made to the keys being hidden or invisible, this is all a matter of degree, which can be tuned to meet the needs of particular applications. In some applications, for example, some visibility is acceptable.

As used herein, "primarily" means more than half (50%). "Predominantly" means more than 75%. "Essentially" means more than 95%. "Almost exclusively" means more than 98%, and "exclusively" means 100%.

Examples of segmented arc regions are the areas shown in solid black FIGS. 5 and 6. These zones do not encompass the origin of the complex plane—so if mirrored about the axes, there would be a gap at the center. Put another way, a segmented arc region typically is characterized, in part, by an arc segment that serves as part of a bounding perimeter, a non-zero distance away from the origin—corresponding to a minimum image frequency. Practically speaking, the segmented arc region is likewise bounded by an outer perimeter that is a finite radius from the origin—indicating the maximum image frequency. Likewise, a segmented arc region typically does not encompass any part of the horizontal (u) or vertical (v) axes. In a particular implementation there may be one segmented arc region, or there may be several. (In many instances such regions may be mirrored around an axis, such as the v axis.

The added/subtracted signal energy is typically placed within a segmented arc region. However, it need not fully occupy the region. An example is shown in the transform domain plane 100 of FIG. 10A. The arc region 102 is defined by an inner perimeter 104 and an outer perimeter 106. This region 102 does not include the origin 108. Nor does it include the horizontal or vertical axes 110, 112. Within this segmented arc region 102 are one or more spatial frequency zones 114 that are increased in spectral energy. Each such zone typically comprises more than a single frequency (e.g., an impulse function), although a single frequency can be used in variant embodiments. Each zone commonly has extent in at least one, and usually two, directions in the transform plane.

Figure 10A:
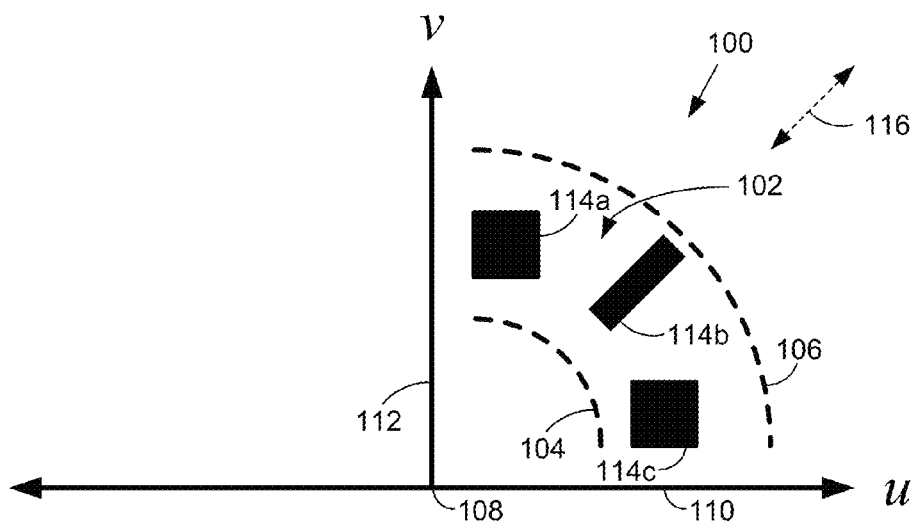
FIGS. 10A and 10B show different spectral signal energies within a segmented arc in Fourier space that can be employed to represent keys.
Figure 10B:
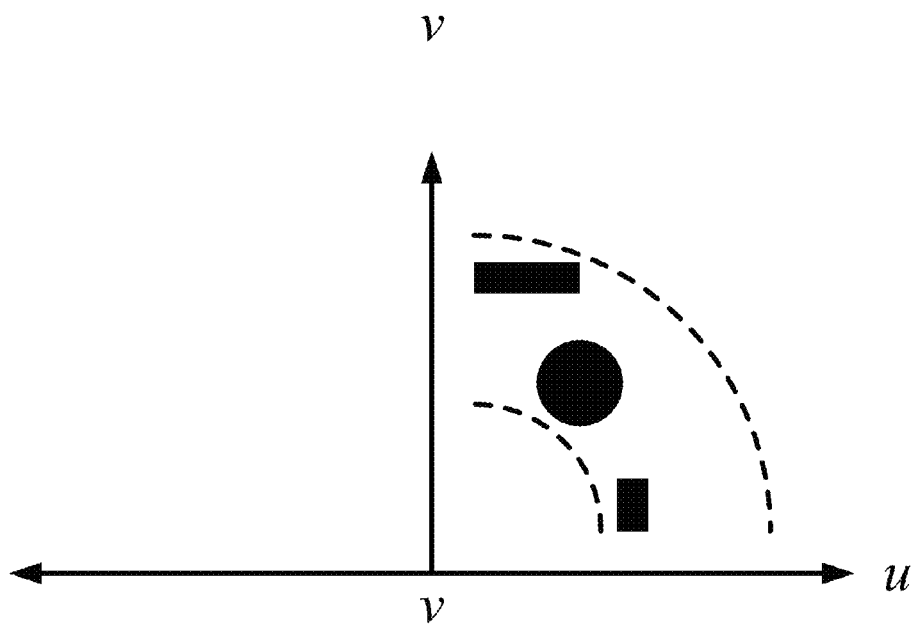

Although the transform domain signal energy zones shown in FIG. 10A have certain symmetry (e.g., around axis 116), this is not required. FIG. 10B, for example, shows another arrangement. Non-symmetrical arrangements are desirable in various instances.

Figure 11A:
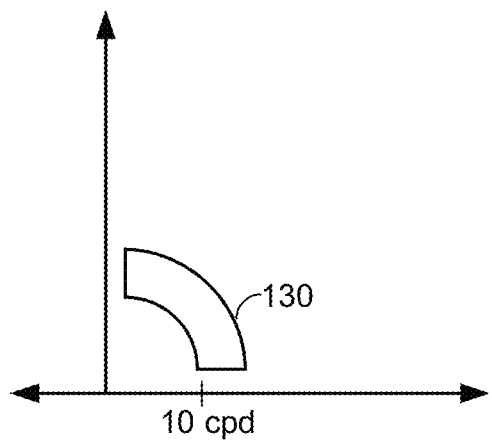
FIGS. 11A-11C illustrate that keys can have harmonic relationships, and can be used in connection with binary encoding.
Figure 11B:
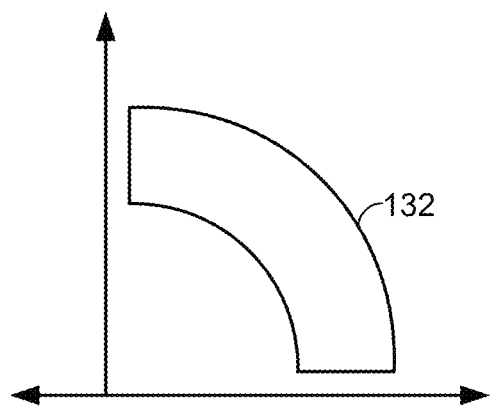

In some instances, the various spatial frequency zones used in encoding an image can have harmonic relations. FIGS. 11A and 11B show one such arrangement. FIG. 11A shows a first zone 130. FIG. 11B shows a second zone 132. Zone 132 comprises frequencies that are twice the frequencies of zone 130. Further harmonics may similarly be used.

Figure 11C:
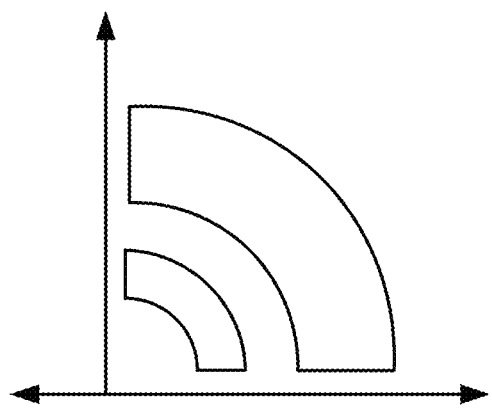

Likewise, the use of different zones can be used for binary signal encoding. The zone 130 may represent a least significant bit, e.g., corresponding to "1" in decimal. Zone 132 may represent a next-least significant bit, e.g., corresponding to "2" in decimal. The addition of signal energy in both zones, as in FIG. 11C thus corresponds to "3" in decimal, etc.

In a variant embodiment, signal energy added to one chrominance channel is matched, in a complementary fashion, by subtraction of signal energy from the other chrominance channel. Such form of embedding is further detailed in published patent application 20100150434. This approach allows use of lower frequency chrominance signals without visible degradation, and yields increased signal-to-noise ratio in the detector when processed according to the cited teachings. (In video according to this technique, the complementary subtraction operation can be applied to the same frame, or to a next frame in the video sequence.)

While it is possible to mark an entire image with a single key, more typically a sub-part of the image is so-marked. Commonly less than 20% of the image area is marked with any particular key. More typically (e.g., as shown in FIGS. 1 and 1A), a contiguous key region encompasses less than 10%, 5%, 3% or 1.5% of the entire image frame.

In practical application, artwork authoring tools such as Adobe Illustrator and the like will doubtless be employed to add keys to imagery. The hidden keys can be represented in visible fashion on the user's screen, such as by dashed outlines, distinctive cross-hatching, etc., so as to indicate the shapes to the user. These can be dragged and resized in known fashion, using tools such as have been popularized by Adobe. The authoring software can further include a print-preview feature that renders the imagery on the screen, including the keys in their hidden form—approximating any color space transformation and other distortions inherent in the printing workflow. (Different print-preview options may be provided, dependent on the type or fidelity of the print process, e.g., high resolution/fully saturated; low resolution/low saturation, etc.) The software may include a viewing mode in which two views (authoring and print-preview) are presented side-by-side.

Corresponding test application software can be provided for a smartphone used by the artist, which senses the added keys from imagery, and provides quantitative data back to the artist. As changes are made to the artwork, this software application can provide immediate feedback. Diagnostic windows can be displayed on the smartphone screen, or the authoring terminal (to which the phone may be linked wirelessly, or by USB or the like). These diagnostic windows can indicate key signal strengths, apparent sizes of key regions, confidence levels for key detection, etc.

Mixed-Domain Displays

In accordance with another aspect of the present technology, a smartphone presents a display that includes both natural imagery captured by the camera, as well as transform-domain information (e.g., in the spatial-frequency, or Fourier, domain) based on camera-captured imagery.

The earlier discussion detailed illustrative reference signals that can be encoded into imagery to aid a steganographic watermark detector in determining whether a watermark is present. Those reference signals are encoded in the spatial-frequency domain—at sufficiently high frequencies, and/or with a chrominance—that causes them to be imperceptible to casual human viewers.

In accordance with further aspects of the present technology, certain such transform domain-based information is revealed to the viewer.

Figure 13:
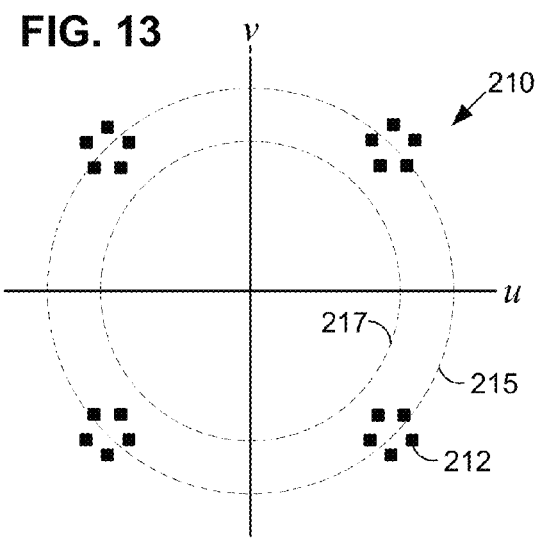
FIG. 13 shows still other marker signals in a spatial-frequency domain.

FIG. 13 shows an exemplary spatial-frequency domain view of a reference signal 210 that is added to printed host imagery, with the real components represented by the horizontal axis, and the imaginary components represented by the vertical axis (the so-called "u, v" plane). The illustrated reference signal comprises pentagonal constellations 212 of spatial domain impulses at frequencies (i.e., distances from the origin) that are too high for humans to perceive, but that are detectable in data produced by the image sensor in a smartphone camera. (The corresponding spatial-frequency domain view of the host imagery is not shown in FIG. 13, but would typically comprise signal scattered throughout the u, v plane—largely concentrated along the horizontal and vertical axes.)

In the FIG. 13 view, the markers 212 are centered on a circle 215. The limit of human vision (in the particular color domain being used) is shown by a smaller circle 217. Features composed of spatial-frequency components outside of circle 217 (e.g., markers 212) are too high in frequency to be discernible to human viewers. (If the markers 212 were lower in spatial-frequency, they would correspond to a pixel pattern that is akin to a fine herringbone weave. At higher frequencies, however, the eye can't distinguish a weave pattern. Rather, the weave dissolves into apparent flatness.)

While four pentagonal marker constellations 212 are shown, of course a lesser or greater number can also be used. Similarly, the markers needn't be pentagonal in form.

When a smartphone camera detects reference pattern 210, it can thereby discern the relative distance between the camera and the printed object, and any rotation and tilt of the camera relative to the object. For example, if the camera is moved closer to the object, the enlarged image components are sensed as having lower component spatial frequencies. Thus, the pentagonal markers move closer to the origin. If the camera is rotated (relative to the orientation at which the reference signal was originally encoded in the host imagery), the pentagonal markers appear similarly rotated. If the camera is tilted—so that part of the printed imagery is closer to the sensor than other parts of the printed imagery—the pattern of pentagons is skewed. (No longer do their centers 214 fall on a circle 215 centered about the u, v origin; instead, they fall on an ellipse.)

Figure 14:
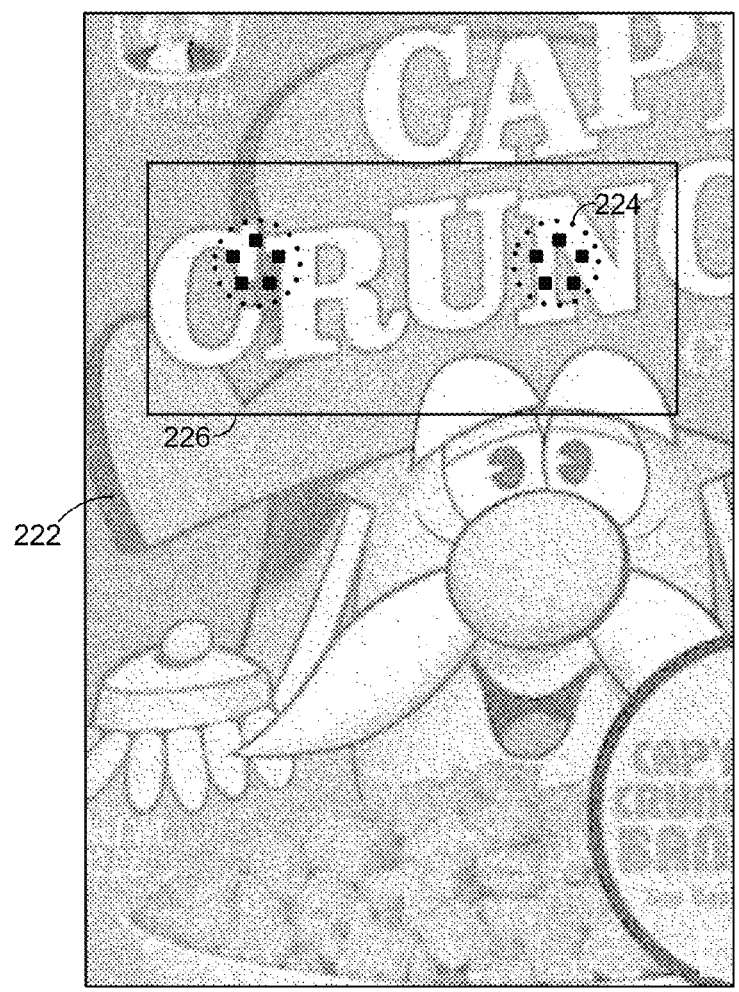
FIG. 14 shows a mixed-domain view of a printed object that includes the marker signals of FIG. 13.

FIG. 14 shows an exemplary smartphone display 220. In this illustration, the smartphone is imaging part of a cereal box—the artwork 222 of which occupies most of the screen. Superimposed on the screen is a half-plane depiction of the detected reference signal, including the top two pentagonal reference markers. The illustrated display also includes two fixed target regions 224—outlined in circular dashed lines. By moving the phone towards or away from the cereal box, and tilting/rotating as necessary, the user can cause the pentagonal markers 212 to move into the two targeting regions 224. At this position, reading of the watermark signal from the cereal box is optimized (i.e., the smartphone camera is positioned to capture a plan view of the box). The smartphone will read the watermark immediately (likely before the markers are aligned in the targeting regions), and the phone will take a corresponding action in response to the detected data.

Desirably, the transform domain overlay is presented at a visibility (strength) that varies with strength of the detected reference signal. If no reference signal is detected (e.g., by a detection metric output by a pattern detector), then no overlay is presented. With stronger signals, the overlaid marker signals are presented with greater contrast—compared to the background image 222. In some embodiments, the markers are presented with coloration that varies in chrominance or luminosity, depending on strength of the detected reference signal.

In one particular implementation, the spatial-frequency representation of the captured imagery is thresholded, so that any spatial-frequency component below a threshold value is not displayed. This prevents the display from being degraded by a Fourier domain representation of the captured cereal box artwork 222. Instead, the only overlaid signal corresponds to the marker signals.

Similarly, the spatial-frequency data may be high-pass spectrally-filtered, so only image components that are above a threshold spatial frequency (e.g., the spatial frequency indicated by circle 217 in FIG. 13) are shown.

The circular target regions 224 are not essential. Other visual guides can be presented, or they can be omitted entirely. In the latter case, the user may be instructed to position the phone so that the markers 224 are even (i.e., horizontally-across). If the transformed data is spectrally-filtered (as described in the preceding paragraph), then the user may be instructed to position the phone towards- or away-from the subject until the markers just appear. (In actual practice, the five points of the markers 212 look a bit like little pixie figures—a head, two hands and two feet, especially when rendered in color. The user can thus be instructed to "look for the pixie people." Their appearance can be made particularly noticeable by giving the five component elements of each marker different colors, and change the colors over time—yielding an engaging, shimmering effect.)

In the particular embodiment depicted in FIG. 14, the spatial-frequency information is shown in a rectangular box 226. In addition to serving as a frame for the spatial-frequency information, this box also serves to define a rectangular sub-region of pixels within the artwork 222, on which the transform domain analysis is performed. That is, instead of converting the entire frame of imagery into the Fourier domain, only those pixels within the box 226 are so-converted. This reduces the burden on the phone processor. (The box 226 may be regarded as the fovea region—the sub-region of pixels on which the processor focuses its attention as it helps the user optimally position the phone.) The luminance of pixels in region 226 can be slightly increased or decreased—to further highlight the region to the user.

Concluding Comments

While this specification earlier noted its relation to the assignee's previous patent filings, it bears repeating. These disclosure materials should be read in concert and construed as a whole, together. Applicant intends, and hereby expressly teaches, that features in each disclosure be combined with features in the others. Thus, for example, the arrangements and details described in this specification can be used in variant implementations of the systems and methods described in published applications 20110098029, 20110098056, and 20100228632, while the arrangements and details of those patent applications can be used in implementations of the systems and methods described in the present specification. Similarly for the other noted documents. Accordingly, it should be understood that the methods, elements and concepts disclosed in the present application be combined with the methods, elements and concepts detailed in those cited documents. While some have been particularly detailed in the present specification, many have not—due to the large number of permutations and combinations, and the need for conciseness. However, implementation of all such combinations is straightforward to the artisan from these teachings.

Elements and teachings within the different embodiments disclosed in the present specification are also meant to be exchanged and combined.

Having described and illustrated the principles of my inventive work with reference to illustrative examples, it will be recognized that the technology is not so limited.

For example, while repeated reference was made to a smartphone, it will be understood that any device can be used. The earlier-cited documents detail some of the variety of devices, and diverse hardware configurations, which can be employed in such systems.

Particularly contemplated smartphones include the Apple iPhone 4, and smartphones following Google's Android specification (e.g., the Verizon Droid Eris phone, manufactured by HTC Corp., and the Motorola Droid 2 phone). The term "smartphone" (or "cell phone") should be construed to encompass all such devices, even those that are not strictly-speaking cellular, nor telephones.

(Details of the iPhone, including its touch interface, are provided in Apple's published patent application 20080174570.)

The design of smartphones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, one or more microphones, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc.).

The processes and system components detailed in this specification may be implemented as instructions for computing devices, including general purpose processor instructions for a variety of programmable processors, including microprocessors (e.g., the Atom and A4), graphics processing units (GPUs, such as the nVidia Tegra APX 2600), and digital signal processors (e.g., the Texas Instruments TMS320 series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of content signal data may also be distributed among different processor and memory devices. "Cloud" computing resources can be used as well. References to "processors," "components," and the like should be understood to refer to functionality, rather than requiring a particular form of implementation.

Software instructions for implementing the detailed functionality can be readily authored by artisans, from the descriptions provided herein, e.g., written in C, C++, Visual Basic, Java, Python, Tcl, Perl, Scheme, Ruby, etc. Cell phones and other devices according to certain implementations of the present technology can include software modules for performing the different functions and acts.

Known browser software, communications software, and media processing software can be adapted for many of the uses detailed herein.

The service by which content owners ascribe certain attributes and experiences to content (e.g., through watermark-triggered invocation of certain actions) typically uses software on the user device—either in the OS or as application software. Alternatively, this service can be implemented—in part—using remote resources.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a server at a remote service provider, different tasks can be performed exclusively by one device or the other, or execution can be distributed between the devices. Extraction of watermark data from content is one example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

(In like fashion, description of data being stored on a particular device is also exemplary; data can be stored anywhere: local device, remote device, in the cloud, distributed, etc.)

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated.

While the present technology was described in the context of static imagery, it is likewise relevant for use with video, e.g., comprising many successive frames, or fields. (Static images can take any known form, e.g., printed, or presented on an electronic display screen.)

To provide a comprehensive disclosure, without unduly lengthening this specification, applicant incorporates-by-reference the patent applications and other documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

As will be recognized, the present specification has detailed many novel arrangements. Due to practical constraints, many such arrangements are not claimed in the original filing of this application, yet applicant intends to claim such other subject matter in subsequent applications claiming priority. An incomplete sampling of some of the inventive arrangements is reviewed in the following paragraphs:

One arrangement is a method of marking color imagery, using a device having a processor that is configured by software stored in a memory. The method includes—within imagery in a spatial or pixel domain—identifying at least one two-dimensional image sub-region. One or more chroma keys is then encoded in the sub-region by altering a transform domain representation thereof, where this altering includes adding image signal energy that falls primarily within a segmented arc region in a transform domain space.

In a further arrangement, such altered imagery is transmitted or stored, together with different auxiliary information. In such further arrangement the encoded chroma key(s), in conjunction with the auxiliary information, serve to cooperatively define a response to the image sub-region when the sub-region sensed by a mobile device including an image sensor.

Another arrangement is a method employing a portable user device that includes a processor portion, and a camera portion. The method includes transforming imagery captured by the camera portion to yield corresponding data in a transform domain. This transform domain information is then analyzed to detect the presence of signal energy (a "key") in a segmented arc region of the transform domain.

In a further arrangement, the method additionally includes receiving plural-bit auxiliary data and, through use of such plural-bit auxiliary data, determining a response corresponding to the detected key.

Yet another arrangement includes capturing image data from a scene using a sensor (e.g., in a smartphone camera); computing a transform-domain representation of at least part of said scene; and presenting on a screen a representation based on said transform-domain representation. (Such a representation can include pixels—the positions of which are based on spatial frequency attributes of the captured image data. Similarly, such a representation can include pixels—the luminance or color of which are based on amplitudes of spatial frequency coefficients of the transformed image data.)

Still another arrangement includes capturing image data from an object using a sensor (e.g., in a smartphone camera); computing a transform-domain representation based on at least part of the captured image data; presenting on a screen a display that is based on said transform-domain representation; and guiding a user in moving the sensor relative to the object, by reference to said presented transform-domain representation.

Yet another arrangement includes capturing image data from a scene using a device that includes a 2D image sensor, where the sensor has a uniform density of sensing elements thereacross (e.g., as in a conventional CMOS or CCD sensor); applying a foveal filtering function to the image data, wherein a sparser sampling of image data is retained outside a foveal zone (as compared to a denser sampling of image data that is retained within the foveal zone); and further processing the foveal-filtered image data.

Apparatuses, sub-combinations, and computer readable media embodying or employing the foregoing methods are also expressly contemplated.

In view of the many embodiments to which principles of this technology can be applied, it should be recognized that the detailed embodiments are illustrative only and should not be taken as limiting the scope of my inventive work. Rather, I claim all such embodiments as fall within the scope and spirit of the following claims, and equivalents thereto. (These claims encompass only a subset of what I regard as inventive in this disclosure. No surrender of unclaimed subject matter is intended, as I reserve the right to submit additional claims in the future.)

I claim:

1. A method practiced using a camera-equipped portable computer system, comprising the acts of:
    capturing image data corresponding to a region using the camera of the portable computer system;
    applying a filter to the captured image data, in which the filter prioritizes image data at a center of the region and averages images data at a relative distance from the center of the region;
    searching the filtered image data for hidden keys.

2. The method of claim 1 in which the camera-equipped portable computer system comprises a smartphone.

3. A non-transitory computer readable medium comprising instructions stored thereon to cause one or more processors to perform the following:
    capture image data corresponding to a region using a camera of a portable computer system;
    apply a filter to the captured image data, in which the filter prioritizes image data at a center of the region and averages images data at a relative distance from the center of the region;
    search the filtered image data for hidden keys.

4. A camera-equipped portable computer system, comprising:
    a camera for capturing image data corresponding to a region;
    memory for storing captured image data; and
    one or more processors programmed for:
        applying a filter to the captured image data, in which the filter prioritizes image data at a center of the region and averages images data at a relative distance from the center of the region;
        searching the filtered image data for hidden keys.

5. A smartphone comprising the camera-equipped portable computer system of claim 4.

* * * * *